United States Patent
Simmons et al.

(10) Patent No.: US 8,166,354 B2
(45) Date of Patent: Apr. 24, 2012

(54) APPARATUS, AND ASSOCIATED METHOD, FOR ESTIMATING A BIT ERROR RATE OF DATA COMMUNICATED IN A COMMUNICATION SYSTEM

(75) Inventors: Sean Simmons, Waterloo (CA); Huan Wu, Kanata (CA)

(73) Assignee: Research In Motion Limited, Waterloo (CA)

(*) Notice: Subject to any disclaimer, the term of this patent is extended or adjusted under 35 U.S.C. 154(b) by 331 days.

(21) Appl. No.: 11/564,953

(22) Filed: Nov. 30, 2006

(65) Prior Publication Data
US 2008/0133983 A1   Jun. 5, 2008

(51) Int. Cl.
*G06F 11/00* (2006.01)
*H03M 13/00* (2006.01)

(52) U.S. Cl. .................... 714/705; 714/706; 714/760

(58) Field of Classification Search ............ 714/704, 714/755, 709, 748, 785, 795, 800; 370/342
See application file for complete search history.

(56) References Cited

U.S. PATENT DOCUMENTS

| | | | |
|---|---|---|---|
| 4,185,302 A * | 1/1980 | Mounts et al. ............. | 382/238 |
| 4,185,303 A * | 1/1980 | Mounts et al. ............. | 382/238 |
| 4,291,403 A * | 9/1981 | Waddill et al. ............. | 714/704 |
| 5,036,515 A * | 7/1991 | Freeburg .................... | 714/708 |
| 5,418,789 A * | 5/1995 | Gersbach et al. .......... | 714/705 |
| 5,815,507 A * | 9/1998 | Vinggaard et al. ......... | 714/704 |
| 6,081,778 A * | 6/2000 | Wong et al. ................ | 704/227 |
| 6,654,924 B1 | 11/2003 | Hassner et al. | |
| 6,792,055 B1* | 9/2004 | Hart ........................... | 375/345 |
| 6,934,327 B1* | 8/2005 | Whited et al. ............. | 375/225 |
| 6,980,586 B1* | 12/2005 | Ballinger ................... | 375/150 |
| 7,336,733 B2* | 2/2008 | Naito ......................... | 375/340 |
| 2005/0078770 A1* | 4/2005 | Visalli et al. .............. | 375/316 |
| 2005/0259770 A1 | 11/2005 | Chen | |
| 2006/0195772 A1 | 8/2006 | Graef et al. | |

FOREIGN PATENT DOCUMENTS

| | | | |
|---|---|---|---|
| EP | 1422862 A2 * | 5/2004 | |
| WO | 9626583 A1 | 8/1996 | |
| WO | 9810422 A1 | 3/1998 | |

* cited by examiner

*Primary Examiner* — Jeffrey A Gaffin
*Assistant Examiner* — Daniel McMahon

(57) ABSTRACT

Apparatus, and an associated method, for estimating a bit error rate of data communicated to a receiving station of a digital communications system, such as a GSM/EDGE cellular communication system. Soft decision values, indicative of confidence levels that decided values have been correctly decided are compared with threshold values by a comparator. A count is accumulated by a counter to whose counted value is representative of decided data values having associated therewith low levels of confidence that the decided values are correct. The count value is used in the formulation of the BER estimation.

16 Claims, 4 Drawing Sheets

APPARATUS, AND ASSOCIATED METHOD, FOR ESTIMATING A BIT ERROR RATE OF DATA COMMUNICATED IN A COMMUNICATION SYSTEM

The present invention relates generally to a manner by which to estimate a bit error rate (BER) of data communicated with a communication station, such as a mobile station of a cellular, or other, radio communication system. More particularly, the present invention relates to apparatus, and an associated method, that forms the estimate using soft decision values. The soft decision values are representative of confidence levels of decisions made of the values of detected symbols received at the communication station.

A count of soft decision values that are of low confidence levels is determinative of the estimated bit error rate. When the count indicates a high percentage of the soft decision values are of low confidence levels, the estimated bit error rate is correspondingly high. And, when the count indicates a high percentage of the soft decision values are of high confidence levels, the estimated bit error rate is correspondingly low.

BACKGROUND OF THE INVENTION

Many different types of communication systems have been developed and deployed that utilize digital communication techniques. Digital communication systems, that is, communication systems that utilize digital communication techniques, generally are able to communicate data at higher data rates and with fewer errors than when data is communicated using analog techniques.

Cellular communication systems, for instance, that are now deployed generally make use of digital communication techniques. While used primarily for voice communications, increasingly, the systems are used by which to effectuate data-intensive data services. Text, photographic, and other data files are able to be communicated between communication stations operable in a cellular communication system. Mobile stations, typically of sizes and weights permitting their carriage by users, are used at which to originate or terminate a communication service in which data is communicated. Voice data as well as the aforementioned other types of data, are communicated to, and by, the mobile station operable in such a cellular communication system.

During operation of a cellular communication system in which digital data is communicated, various metrics are used to quantify the quality of the communicated data or of the communication channel upon which the data is communicated. For instance, a bit error rate (BER) is one of such metrics. A bit error rate is a quantification of the number of bit errors, on a time basis, that are introduced into data when the data is communicated upon a communication channel or during its processing once received at a receiver. Large bit error rates are sometimes indicative of poor channel conditions. Whatever the cause, however, a high bit error rate makes the recovery of communicated data more difficult. Compensation can sometimes be made to correct for bit errors in the communicated data. Or sometimes, a data packet or frame that includes too many bit errors is discarded and the data is resent. Quantifications of the bit error rate are used for additional purposes, e.g., to select a modulation scheme and to select when to hand off communications. In some system implementations, when communication conditions are good, a modulation scheme is selected to increase data throughput, and when communication conditions are poor, the modulation scheme is selected to increase the chances of successful communication of the data. And, when used to select when to request a hand off of communications, measurement of increasing bit error rates indicates that a potential hand off of communications would result in an improvement of communications.

Further by way of an example, in a GSM/EDGE (Global System for Mobile Communications/Enhanced Data for GPRS Evolution) cellular communication system, a quantification of the bit error rate, is required to be reported by a mobile station to the network part of the communication system at regular intervals. The bit error rate is used as a received signal quality measurement (RXQUAL). The quantification of the bit error rate is used in the system, e.g., as a means of false alarm reduction for bad speech frames that pass CRC (Cyclic Redundancy Code) comparison.

While various bit error rate estimation schemes are conventionally utilized, the estimation accuracy of such conventional estimators typically exhibit large variance, depending upon, e.g., channel propagation profiles, coding schemes, and equalization types. The BER estimation is sometimes based upon comparisons between known training sequence (TS) values and determinations of received data values. Estimations based on values of the training sequence results in estimations being made upon a relatively small, e.g., 26 symbol-length sequence, resulting in potentially-high estimation variance. That is, the BER estimation is not necessarily reflective of the average bit error rate across an entire burst of data. Other bit error rate estimation schemes exhibit other drawbacks. BER estimation subsequent to channel decoding, based upon SNR-BER (Signal to Noise Ratio-Bit Error Rate) mapping, and other conventional schemes all result in estimations that are problematical under certain communication conditions.

If an improved manner could be provided by which to perform bit error rate estimations, improved communication performance of a communication system would be possible.

It is in light of this background information related to digital communications that the significant improvements of the present invention have evolved.

DETAILED DESCRIPTION

Figure 1:
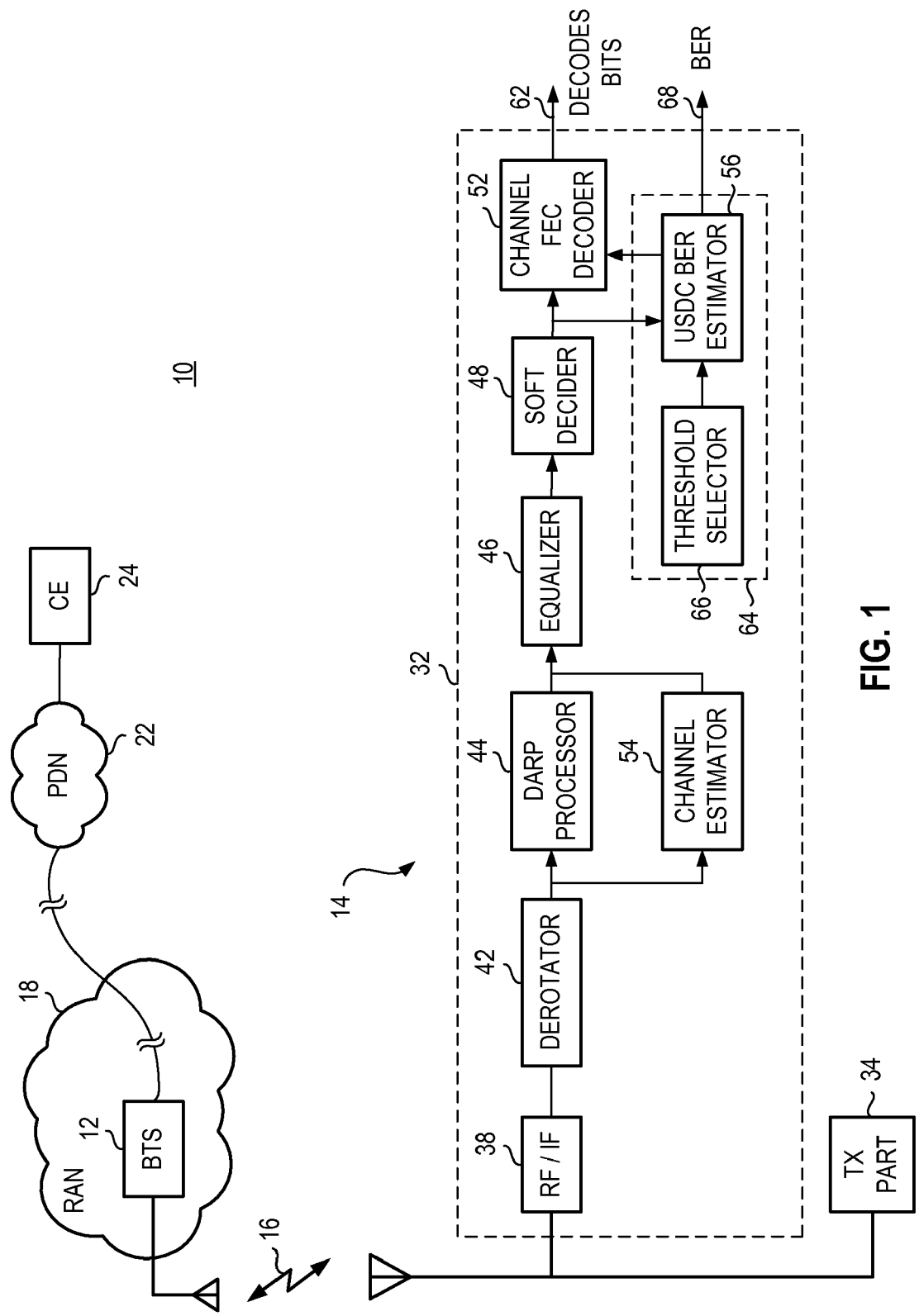
FIG. 1 illustrates a functional block diagram of a communication system in which an embodiment of the present invention is operable.

The present invention, accordingly, advantageously provides apparatus, and an associated method, by which to estimate a bit error rate of data communicated with a communication station of a digital radio, or other, communication system.

Through operation of an embodiment of the present invention, an estimation of the bit error rate is provided that uses soft decisions that are associated with detections of symbol values of a received sequence of data. The soft decisions are
} values that are representative of confidence levels that received data symbols are correctly identified. When there is a low confidence level that the symbol value decision is correctly made, the soft decision value is correspondingly low. And, when there is a high confidence level that the symbol value is correctly decided, the soft decision value is correspondingly high. Intuitively, then, a received sequence of data whose decided symbol values have associated therewith large numbers of soft decisions indicating low confidence levels of the correctness of the decisions, the bit error rate of the communicated data is likely to be high. And, conversely, when the soft decisions indicate high confidence levels with large numbers of the decisions, the bit error rate of the communicated data is likely to be low.

In one aspect of the present invention, therefore, a BER estimator is provided that forms an estimate of a bit error rate responsive to a determination of the number of soft decisions associated with decided symbol values that indicate low confidence levels with the decisions. When large numbers of the decided symbol values are associated with low levels of confidence that the decided values are correct, the bit error rate estimate is large. And, conversely, when large numbers of the decided symbol values are associated with high levels of confidence that the decided symbol values are correct, the bit error rate estimate is small.

In another aspect of the present invention, a count is maintained of soft decisions, associated with decided symbol values that are of low confidence levels. The count is used in the determination of the estimation of the bit error rate. The count is provided, for instance, by an accumulator that increments each time in which a soft decision associated with a decided symbol value is of a low value. The BER estimate is directly proportional to the count value.

In another aspect of the present invention, the values of the selections representative of the confidence levels are provided to a comparator. They comparator compares the soft decision value with a threshold value. Depending upon the results of the comparison, a determination is made as to whether the associated, decided symbol value is believed to be correct. If the soft decision is of a value indicating that the soft decision is of a low reliability, then the count is incremented. Otherwise, the count is not incremented. Thereby, a count is created, adjusted, and maintained on a symbol-by-symbol basis.

In another aspect of the present invention, the threshold used by the comparator against which to compare the soft decision value is selectable. The threshold is selected, for instance, to be based upon prior simulations or upon any other appropriate basis, such as prior results.

In another aspect of the present invention, the count value accumulated at an accumulator, or otherwise maintained, is resettable at selected intervals or responsive to data reception start or end.

In a further aspect of the present invention, the count value, determinative of the bit error rate estimate, is combined with a value responsive to the total number of symbols or bits that are operated upon during which the count is maintained. The count value, for instance, is divided by the total number of bits or symbols that are received and the result forms the bit error rate estimate.

The estimate of the bit error rate is formed quickly, without requiring significant processing computations. The estimation of the bit error rate is not limited to, e.g., a training sequence but rather can be, if desired, formed based upon a lengthy sequence of received symbols. And, as the estimation is based upon confidence levels of decided symbol values, poor channel conditions, or other conditions that would cause an actual bit error rate to be high, correspondingly cause the estimated bit error rate to be high.

In these and other aspects, therefore, apparatus, and an associated method, is provided for a receiver that receives a sequence of digital data. A detector is adapted to receive an indication of a confidence level associated with detected values of the sequence of digital data. The detector is configured to detect whether the confidence level is beyond a selected threshold. An accumulator is adapted to receive indication of detections made by detector. The accumulator is configured to accumulate a count of detected values of the sequence having a confidence level beyond the selected threshold. The count is determinative of a bit error rate estimation of a data communication associated with the sequence of the digital data.

Turning first to FIG. 1, a communication system, shown generally at 10, provides for communication of data between a set of communication stations. Here, the set of communication stations includes a sending station 12 and a receiving station 14. The sending station 12 is here shown to be a network station, specifically, a base transceiver station (BTS) of a GSM (Global System for Mobile communications) system that provides for EDGE (Enhanced Data for GSM Evolution) communication services. And, the communication station 14 is representative of a mobile station that operates to communicate by way of a radio air interface 16 with communication stations, such as the BTS 12, of the network part of the cellular communication system. More generally, the communication stations are representative of any set of communication stations in which data is communicated by a sending station to a receiving station.

For purposes of describing exemplary operation on an embodiment of the present invention, the following description shall describe operation with respect to the exemplary implementation in which the base transceiver station forms a sending station, and the mobile station 14 forms a receiving station. Analogous operation can be described with respect to other types of communication systems. The following description is, accordingly, exemplary only and not by way of limitation.

The network part of the communication system is here further shown to include a radio access network (RAN) part 18 of which the base transceiver Station 12 forms a portion and a packet data network (PDN) 22, such as the Internet backbone to which a communication endpoint (CE) 24 is representative of an ultimate communication source or destination of data communicated during operation of the communication system.

The data that is communicated by the base transceiver station upon the radio air interface 16 is formed of data symbols, each defined by one or more bit values. For instance, in an 8-PSK (8-Phase Shift Keying) scheme, the symbols are represented by groups three bits, the values of which define the value of the PSK symbol. The terms symbols and bits shall, at times, be used herein interchangeably. Operation of an embodiment of the present invention is analogous irrespective of the number of data bits, one or many, used to form a data symbol.

When communicated upon the radio air interface 16 by the sending station 12 and received and operated upon by the receiving station 14, distortion is sometimes introduced upon the transmitted values such that the values are changed. If not corrected, the distorted values interfere with recovery of the informational content of the transmitted information of the data. And, as noted previously, estimation of a bit error rate (BER) is formed and used to quantify the errors introduced upon the communicated data. Its value is used, also as indicated above, to take corrective action when the bit error rate becomes too high. However, as also noted above, the estimations that are conventionally made sometimes are not accurate representations of the true error rates across an entire sequence of communicated data.

The mobile station forming the receiving station 14 includes transceiver circuitry including a receive part 32 and a transmit part 34. Elements of the receive part include an RF/IF (radio frequency/intermediate frequency) element 38, a derotation element 42, a DARP processor 44, an equalizer 46, a soft decision corrector 48, a channel FEC decoder 52, a channel estimator 54, and a USDC (Unreliable Soft Decisions Count) BER estimator 56 of an embodiment of the present invention.

The element 38 operates, in a conventional fashion, to down-convert and to modulate signals received at the receive part and to provide I/Q samples to the derotator 42. The derotator derotates the samples applied thereto and provides the derotated values to both the DARP (Downlink Advanced Reception Performance) processor and 44 and to the channel estimator 54. The processor performs processing operations upon the derotated data that, in turn, is provided to the equalizer 46. The channel estimator 54 operates to estimate the channel upon which the data has been communicated. Equalization is performed upon the data using the channel estimate provided by the channel estimator, and equalized values are provided to the soft decision corrector 48.

Soft decisions are made by the corrector 48 that include a decided symbol value of the received data as well as a confidence level associated with the decided value. The decided symbol values are provided to the channel FEC (Forward Error Correction) decoder 52, and decoding operations are performed by the decoder to form decoded bits on the line 62. And, the soft decision confidence level values are provided to the USDC BER estimator 56 that forms part of the apparatus 64 of an embodiment of the present invention. The apparatus 64 is here shown further to include a threshold selector 66.

Estimates made by the estimator are generated on the line 68. The generated estimates of the bit error rate are used by the mobile station pursuant to any of various operations, including, e.g., generation of RXQUAL (Received signal QUALity measurement) reports.

Figure 2:
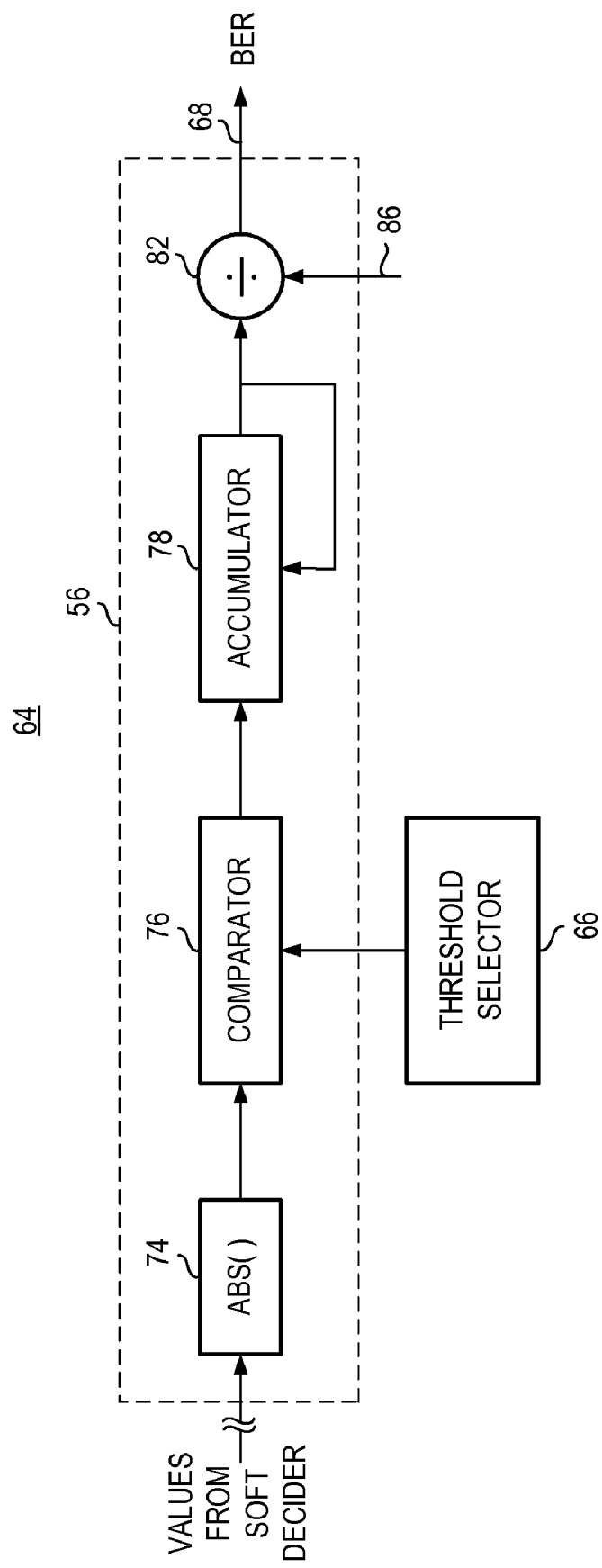
FIG. 2 illustrates a functional block diagram of a bit error rate (BER) estimator that forms part of the communication system shown in FIG. 1.

Turning next to FIG. 2, the apparatus 64 is again shown. Here, the estimator 56 is shown to be formed of an absolute value generator 74, a comparator 76, and accumulator 78, and a divider 82. The elements of the apparatus are functionally represented, implementable in any manner, including, in part, or in entirety, by algorithms executable by processing circuitry.

Soft decisions generated by the soft decision corrector 48 (shown in FIG. 1) are provided to the absolute value, i.e. magnitude, generator 74. The absolute value generator forms absolute values of the soft decision values that identify the confidence level associated with successive bits or symbol values. The absolute values are provided to the comparator 76.

The comparator operates to compare the absolute values of the soft decisions with a threshold value, here provided by these threshold selector 66. The comparator compares the soft decision values provided thereto with threshold levels and generates a logical output depending upon whether the soft decision is greater than or less than the selected threshold level. In an exemplary implementation, positive logic is utilized, and, if the soft decision value is less than the threshold level, a logical one is generated by the comparator. Otherwise, a logical zero is generated The comparator output value is provided to the accumulator 78. The accumulator increments each time in which, here, a logical value of 1 is provided thereto. Thereby, the accumulator maintains a count, and forms a counter, that is representative of decided symbol values that have a low confidence level of the decided symbol value being correct. A feedback loop 84 is used, e.g. clocking of the accumulator. The accumulated value is also resettable, such as at the end of, or prior to the start of, a data transmission.

Accumulated values are provided to the divider 82. And, an indication of the total number of processed bits or symbols is also provided to the divider, here indicated by way of the line 86. The divider forms a value representative of the results of the division on the line 68. The results of the division form the bit error rate estimate. The bit error rate estimate is directly proportional to the number of soft decisions that indicate a corresponding selected value of received data to be of increased likelihood of being in error. The estimate is not limited to an estimation based upon a training sequence, or other small portion of communicated data and is also calculated with relatively few operations, as indicated by the few functions of the functional block diagram of FIG. 2.

The selection of the threshold value applied to the comparator and used thereat for purposes of comparison is selected by a threshold selector. The threshold selector, in one implementation, simply forms a stored value that permanently forms part of the circuitry of the communication station 14 and is used when the comparator operates to perform the comparison operations. The value is obtained, in one implementation, by communication simulations that best approximate a bit error rate. The selectable threshold, in another implementation, is changeable, or otherwise updateable.

Figure 3:
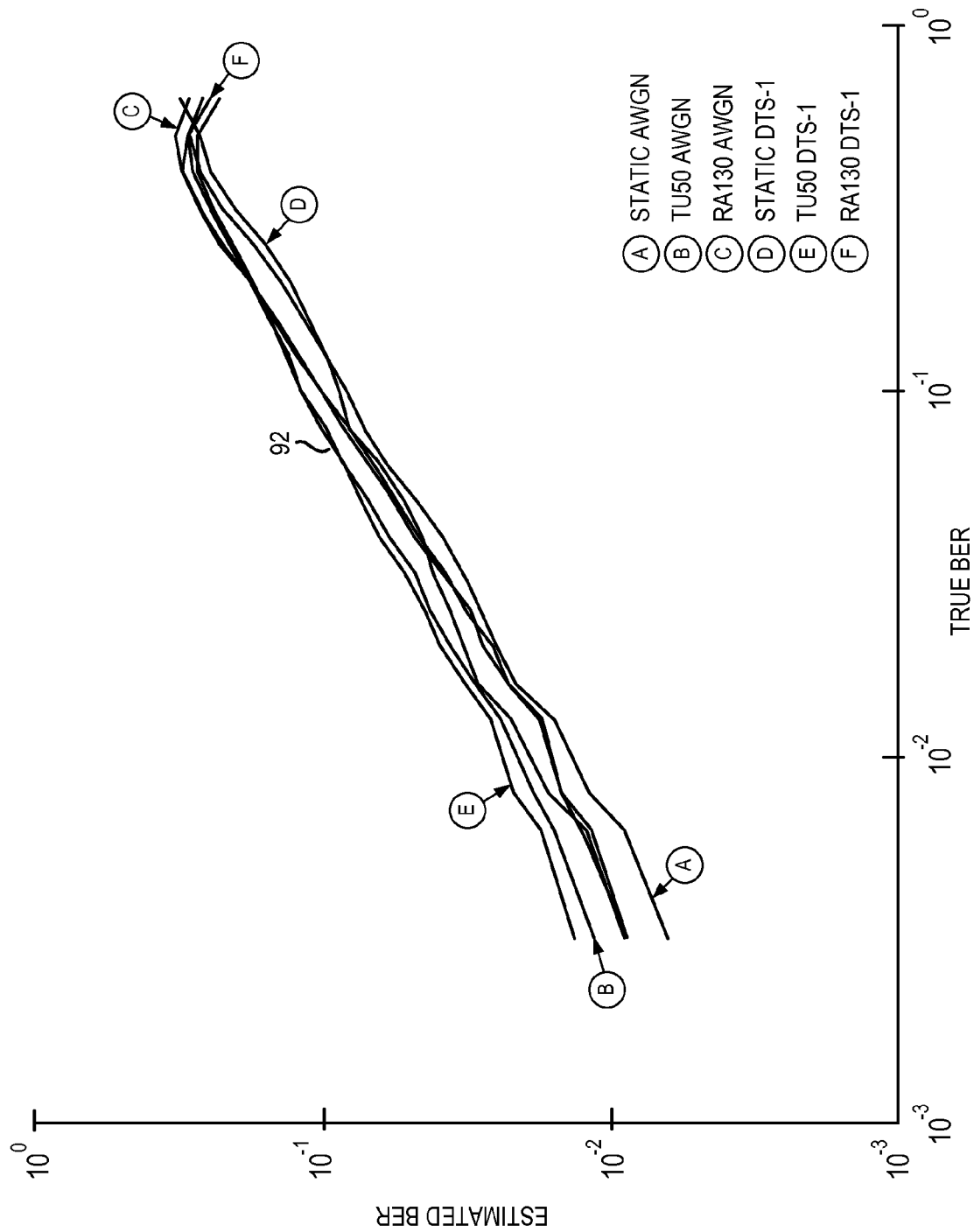
FIG. 3 illustrates a graphical representation of an exemplary relationship between estimated and actual bit error rates used pursuant to selection of a comparator threshold used pursuant to operation of an embodiment of the present invention.

FIG. 3 illustrates an exemplary graphical representation of plots of estimated bit error rates, plotted against an actual bit error rate, here in which 8-PSK bursts are communicated. Variants of the plots 92 are formed during various channel conditions. While not separately numbered, the various plots identify the exemplary relationship between the estimated and actual bit error rates for static AWG (Average White Gaussian noise), TU 50 noise, RA 130 noise, static DTS-1, TU 50 DTS-one, and RA 130 DTS-1 conditions. Exemplary experimental and simulated results indicate, e.g., that an appropriate threshold is 0.074 GMSK (Gaussian median shift keying) bursts and 0.0848-PSK bursts in a GSM/EDGE receiver.

Figure 4:
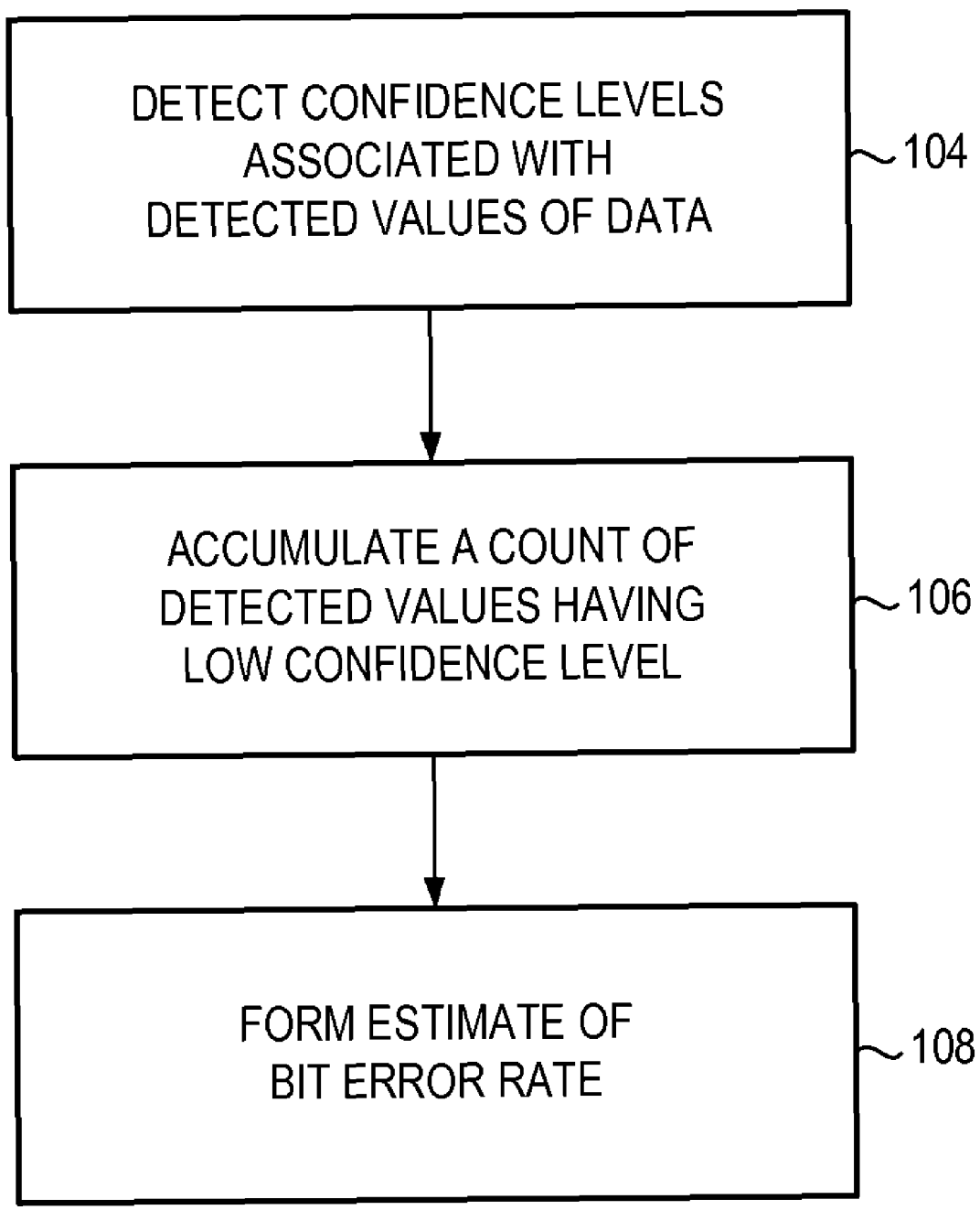
FIG. 4 illustrates a method flow diagram representative of the method of operation of an embodiment of the present invention.

FIG. 4 illustrates a method flow diagram, shown generally at 102, representative of the method of operation of an embodiment of the present invention. The method estimates a bit error rate associated with a data communication received at a receiver.

First, and as indicated by the block 104, indications of confidence levels associated with detected values of data received at the receiver are detected. Then, and as indicated by the block 106, a count of detected values having a confidence level less than a selected threshold is accumulated.

Then, and as indicated by the block 108, a bit error rate estimate is formed responsive to the count.

Thereby, a bit error rate estimation is provided. The estimation is based upon an unreliable soft decision count and is relatively simply and easily implemented. Improved accuracy with less variation of the BER estimations relative to conventional estimations is also provided.

The previous descriptions are of preferred examples for implementing the invention, and the scope of the invention should not necessarily be limited by this description. The scope of the present invention is defined by the following claims.

What is claimed is:

1. Apparatus for estimating a bit error rate at a receiver that receives a sequence of digital data from a digital transmission and generates a sequence of decision values, each decision value representing a confidence level associated with a decided symbol value, the confidence level representative that the decided symbol value is correctly decided, said apparatus comprising:
a threshold selector configured to select a selected threshold;
a detector adapted to receive a decision value and said selected threshold, said detector configured to detect whether the decision value is less than the selected threshold, indicative of a low confidence level of correctness of the decided symbol value; and
an accumulator adapted to receive indication of detections made by said detector, said accumulator configured to maintain a count of detections indicative of decision values that are less than the selected threshold during the sequence of digital data from the digital transmission and to increment said maintained count each time in which the decision detected by said detector is indicative of the low confidence level and to provide said maintained count for formation of a bit error rate estimation of the sequence of the digital data from an adjustable total number that is proportional to the processed bits from the digital transmission.

2. The apparatus of claim 1 wherein said detector comprises a comparator configured to compare the confidence level decision value with the selected threshold and to form a comparator result value representative of comparisons made by said comparator.

3. The apparatus of claim 2 wherein said detector further comprises a magnitude calculator adapted to receive the decision value, said magnitude calculator configured to calculate an absolute-value of the decision value.

4. The apparatus of claim 3 wherein the absolute-value of the decision value calculated by said magnitude calculator is provided to said comparator, and wherein said comparator compares the absolute-value of the decision value with the selected threshold.

5. The apparatus of claim 2 wherein the comparator result value is of a first value when the decision value is greater than the selected threshold and wherein the comparator result value is of a second value when the decision value is less than the selected threshold.

6. The apparatus of claim 1 wherein selection made by said threshold selector is based upon simulated approximation and experimentally measured values of bit error rates.

7. The apparatus of claim 1 further comprising a bit error rate calculator adapted to receive said provided count maintained by said accumulator, said bit error rate calculator configured to calculate the bit error rate estimation, the bit error rate estimation dependent, in part, upon said provided count.

8. The apparatus of claim 7 wherein the said bit error rate calculator is further adapted to receive an indication of a total number of processed data symbols whose decision value is detected by said detector, said bit error rate calculator configured to calculate the bit error rate, the bit error rate estimation further dependent, in part, upon the indication of the total number of processed data symbols.

9. The apparatus of claim 8 wherein said bit error rate calculator comprises a divider that divides the count by the indication of the total number of processed data symbols.

10. The apparatus of claim 1 further comprising a decision corrector configured to form a confidence level associated with each decision.

11. A method for estimating a bit error rate associated with a data communication sequence from a digital transmission received at a receiver that receives a sequence of digital data and generates a sequence of decision values, each decision value representing a confidence level associated with a decided symbol value, the confidence level representative that the decided symbol value is correctly decided, said method comprising the operations of:
selecting a selected threshold;
detecting whether a decision value is less than the selected threshold, which is indicative of a low confidence level of correctness of the decided symbol value;
maintaining a count of detections indicative of decision values that are less than the selected threshold during the data communication sequence from the digital transmission and incrementing said maintained count each time in which a decision value detected during said detecting is indicative of the low confidence level; and
forming a bit error rate estimate responsive to the maintained count and an adjustable total number that is proportional to the number of processed bits from the digital transmission.

12. The method of claim 11 wherein the bit error rate estimate formed during said operation of forming is directly proportional to the maintained count during said operation of maintaining and incrementing.

13. The method of claim 11 wherein the bit error rate estimate formed during said operation of forming is further responsive to a data length associated with the maintained count during said operation of maintaining and incrementing.

14. The method of claim 13 wherein said operation of forming comprises dividing the count by the data length.

15. The method of claim 11 wherein said operations of detecting, maintaining, and forming are performed iteratively.

16. Apparatus for estimating a bit error rate of a sequence of digital data at a receiver that receives the sequence of digital data from a digital transmission and generates a sequence of decision values, each decision value representing a confidence level associated with a decided symbol value, the confidence level representative that the decided symbol value is correctly decided, said apparatus comprising:
a decision corrector configured to decide a symbol value from the digital data and provide a decision value associated with the decided symbol value;
a threshold selector configured to select a selected threshold;
a comparator adapted to receive a decision value from said decision corrector and said selected threshold, said comparator configured to determine whether the decision value is less than the selected threshold, indicative of a low confidence level of correctness of the decided symbol value;
an accumulator adapted to receive indication of detections made by said detector, said accumulator configured as a counter to maintain a count of detections indicative of decision values that are less than the selected threshold during the sequence of digital data from the digital transmission and to increment said maintained count each time in which the decision detected by said detector is indicative of the low confidence level; and
an arithmetic operator adapted to receive said maintained count from the accumulator and an adjustable total number that is proportional to the processed bits from the digital transmission and to form, from the maintained count and the adjustable total number, a bit error rate estimation of the sequence of digital data.

* * * * *